United States Patent [19]

Hicks et al.

[11] Patent Number: 4,520,676
[45] Date of Patent: Jun. 4, 1985

[54] ADJUSTABLE TANGENT ASSEMBLY FOR A DIAPHRAGM GAS METER

[75] Inventors: Irwin A. Hicks, Radnor; Charles W. Albrecht, Warminster, both of Pa.

[73] Assignee: The Singer Company, Stamford, Conn.

[21] Appl. No.: 488,290

[22] Filed: Apr. 25, 1983

[51] Int. Cl.³ ............................................. G01F 3/22
[52] U.S. Cl. ................................. 73/281; 81/57.29; 81/461
[58] Field of Search ............... 73/281, 239, 267, 269, 73/263, 233; 81/57.29, 461

[56] References Cited

U.S. PATENT DOCUMENTS

| | | | |
|---|---|---|---|
| 876,875 | 1/1908 | Henning et al. | |
| 1,293,965 | 2/1919 | Sprague. | |
| 1,893,022 | 1/1933 | Douillard | 73/281 |
| 2,775,891 | 1/1957 | Douglas | 73/281 |
| 3,011,344 | 12/1961 | Vitello | 73/281 |
| 3,261,206 | 7/1966 | Stewart | 73/281 |
| 3,411,358 | 11/1968 | St. Clair et al. | |
| 3,668,929 | 6/1972 | Ruddy. | |

*Primary Examiner*—Tim Miles
*Attorney, Agent, or Firm*—David L. Davis; Robert E. Smith; Edward L. Bell

[57] ABSTRACT

An adjustable tangent assembly for a positive displacement diaphragm gas meter is provided with a pair of concentric face gears coaxial with the axis of rotation of the crank shaft and accessible through a small plug hole in the meter cover. An adjusting tool inserted through the plug hole allows independent self locking adjustment of the timing and stroke with high resolution.

13 Claims, 13 Drawing Figures

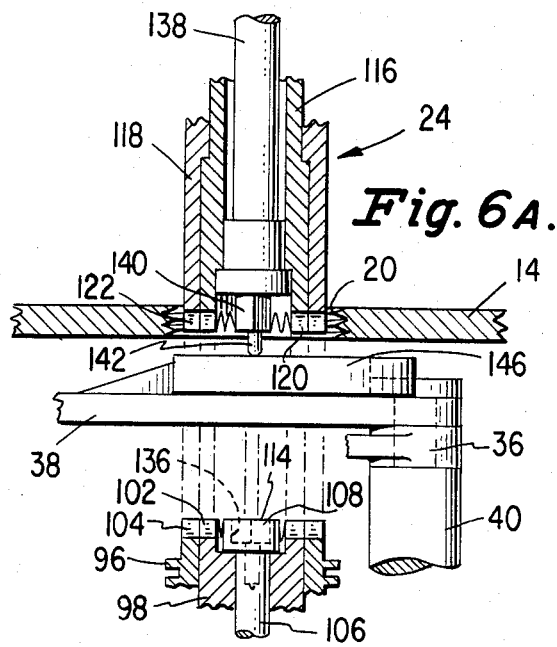
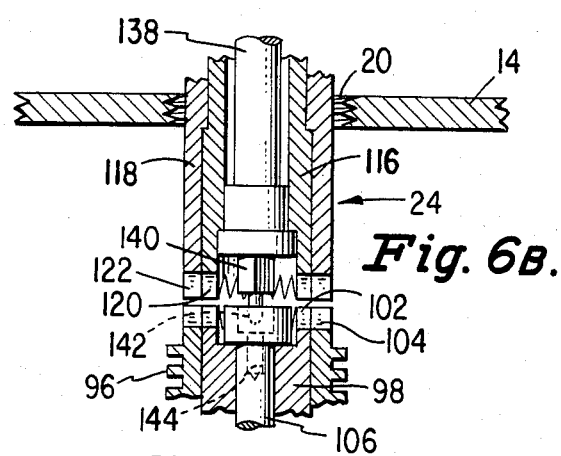
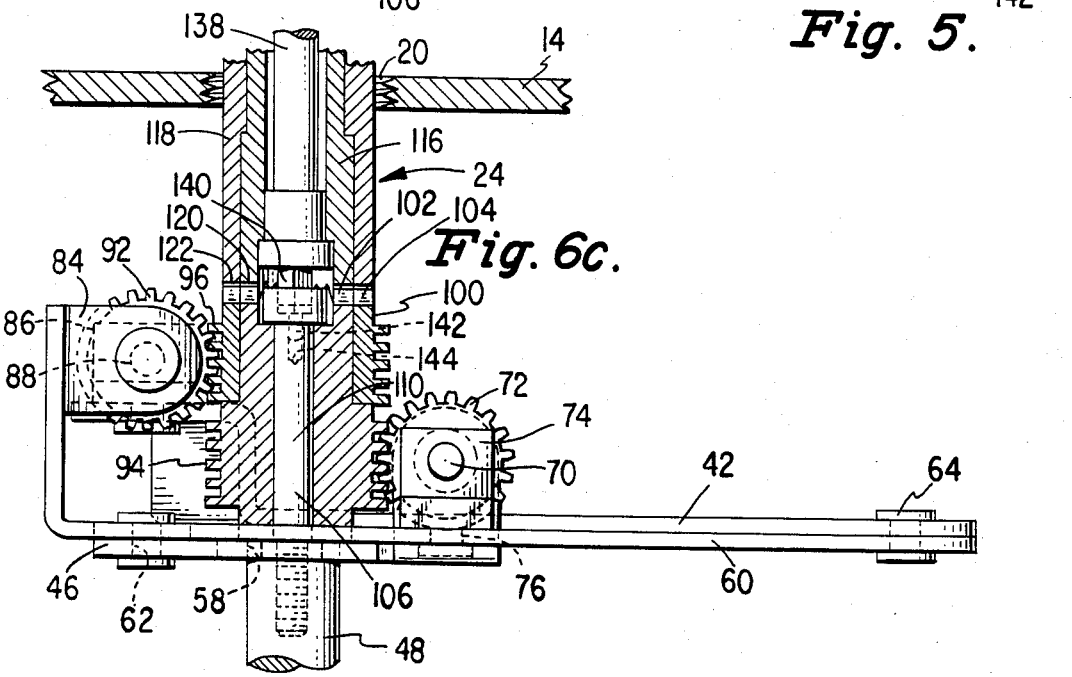
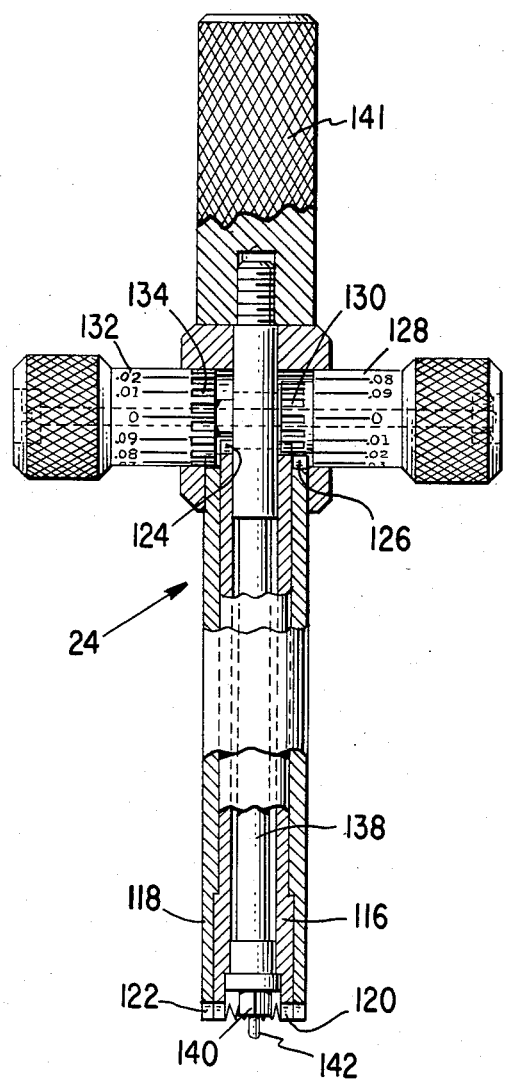

ADJUSTABLE TANGENT ASSEMBLY FOR A DIAPHRAGM GAS METER

DESCRIPTION

BACKGROUND OF THE INVENTION

This invention relates to diaphragm gas meters and, more particularly, to an improved adjustable tangent assembly for use therewith.

Positive displacement diaphragm gas meters typically are provided with a tangent which drivingly couples the diaphragm driven flag assembly to the crank shaft which is in turn coupled to open and close the slide valves of the meter. It is common practice to provide an adjustable tangent so that the timing of the valves and the stroke of the diaphragms may be adjusted to calibrate the meter. Existing arrangements for providing such an adjustable tangent suffer from a number of drawbacks. A very serious drawback is the requirement for a large "handhole" in the meter cover to afford access to the tangent adjustment screws within the gas distribution chamber area. This large handhole necessitates the provision of a gasket and screws to secure the handhole cover. Often, tie wires and seals are required to provide tamper resistance.

Other deficiencies of existing designs include difficulty of adjustment due to space restrictions and further that whatever adjustment is made, the resolution of such adjustment is relatively crude. Additionally, adjustment with external tools is very difficult due to the internal location and the configuration of the adjustment screws. Accordingly, automated adjustment is not possible. Still further, in most designs, the stroke adjustment affects the timing, and the timing adjustment affects the stroke.

It is therefore an object of this invention to provide an improved adjustable tangent assembly.

It is another object of this invention to provide such an assembly which is adjustable from outside the meter.

It is a further object of this invention to provide such an assembly which is amenable to automated adjustment.

It is still another object of this invention to provide a tool for use with the adjustable tangent assembly.

It is yet another object of this invention to provide an adjustable tangent assembly wherein the timing and stroke adjustments are independent from each other.

It is another object of this invention to provide an adjustable tangent assembly wherein only a minimal opening in the meter cover is required.

It is another object of this invention to provide an adjustable tangent assembly having a high adjustment resolution.

It is another object of this invention to provide an adjustable tangent assembly wherein the adjustment mechanism is self-locking.

SUMMARY OF THE INVENTION

The foregoing, and additional, objects are attained in accordance with the principles of this invention by providing an adjustable tangent assembly for a gas diaphragm meter which includes a lock plate, a timing plate and a stroke plate. The lock plate and the timing plate are pivotally connected, and the timing plate and the stroke plate are pivotally connected. A first adjustable connection is provided between the timing plate and the lock plate and a second adjustable connection is provided between the timing plate and the stroke plate. (It is noted that the stroke plate could be connected to the lock plate in place of the timing plate). The meter flag assembly is connected to a wrist pin fixedly attached to the stroke plate and the lock plate is non-rotatably connected to the crank shaft along its axis of rotation. Adjustment of the tangent is effected through a pair of concentric face gears mounted on worms engaging gears on the two plate-to-plate connecting mechanisms. The worms are coaxial with the axis of rotation of the crank shaft. A small plug hole is provided in the meter cover, which plug hole is also coaxial with the crank shaft axis of rotation. The adjustment tool comprises a pair of independently rotatable barrels having face gears at their ends adapted to engage the face gears of the worms. (It is noted that other means of coaxial gearing, such as bevel gears, could be used). To insure that adjustment can only be effected during an appropriate angular relationship of the elements, a deflector shield is provided on one of the flag arms.

In accordance with an aspect of this invention, means are provided whereby the crank shaft is prevented from rotating when the tool is engaged with the adjusting gears.

BRIEF DESCRIPTION OF THE DRAWINGS

The foregoing will be more readily apparent upon reading the following description in conjunction with the drawings wherein:

FIG. 5 is a side view, partially in section, of an adjusting tool constructed in accordance with the principles of this invention;

FIGS. 6A, 6B, and 6C illustrate the sequence involved with inserting the adjusting tool of FIG. 5 through the plug hole in the meter cover and into engagement with the adjusting mechanism;

DESCRIPTION

Figure 1:
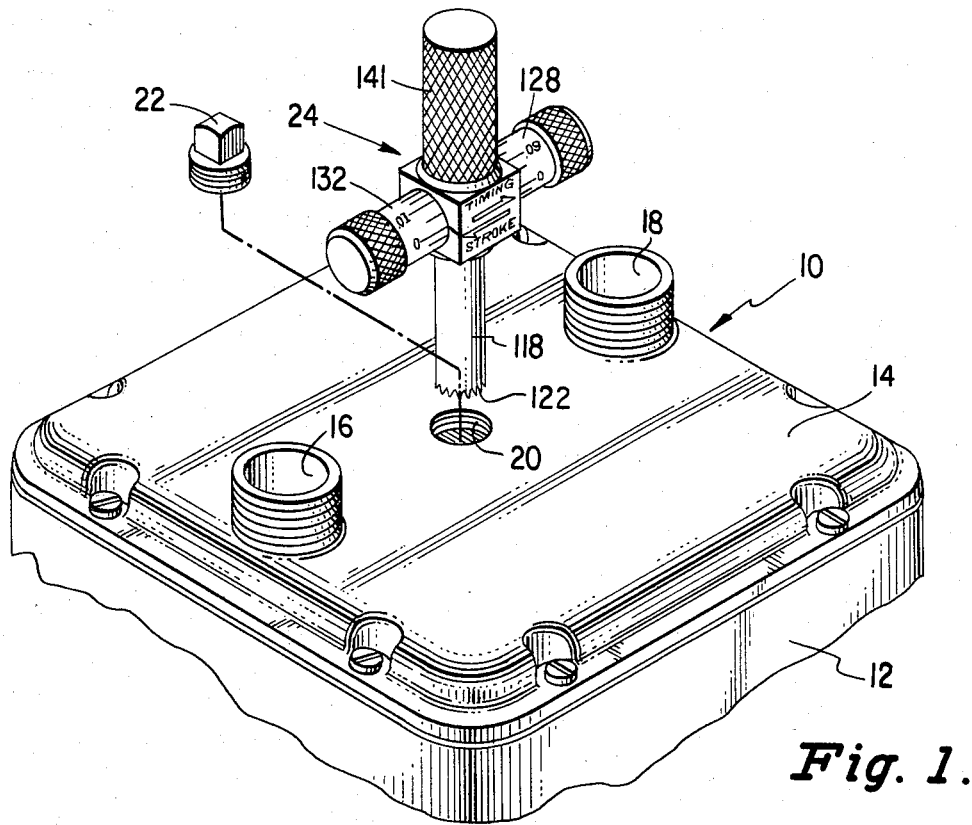
FIG. 1 is a perspective view showing the upper portion of the housing and the cover of a positive displacement diaphragm gas meter having a tangent assembly constructed in accordance with the principles of this invention and further illustrating the adjusting tool for use with such assembly.

Referring now to the drawings, wherein like elements in different figures thereof have the same reference character applied thereto, FIG. 1 shows a rotary positive displacement diaphragm meter, designated generally by the reference numeral 10, having a housing including a body portion 12 and a cover 14. The cover 14 includes a gas inlet connector 16 and a gas outlet connector 18, as is conventional in the art. In accordance with the principles of this invention, the cover 14 is formed with an internally threaded bore 20 which, as will be described in full detail hereinafter, is coaxial with the axis of rotation of the meter crank shaft. An externally threaded plug 22 is provided to close the bore 20 during normal operation of the meter 10. However, when the meter 10 is being calibrated or adjusted, the plug 22 is removed. The bore 20 is of sufficient size to enable the insertion of the adjusting tool, designated generally by the reference numeral 24, therethrough.

Figure 2:
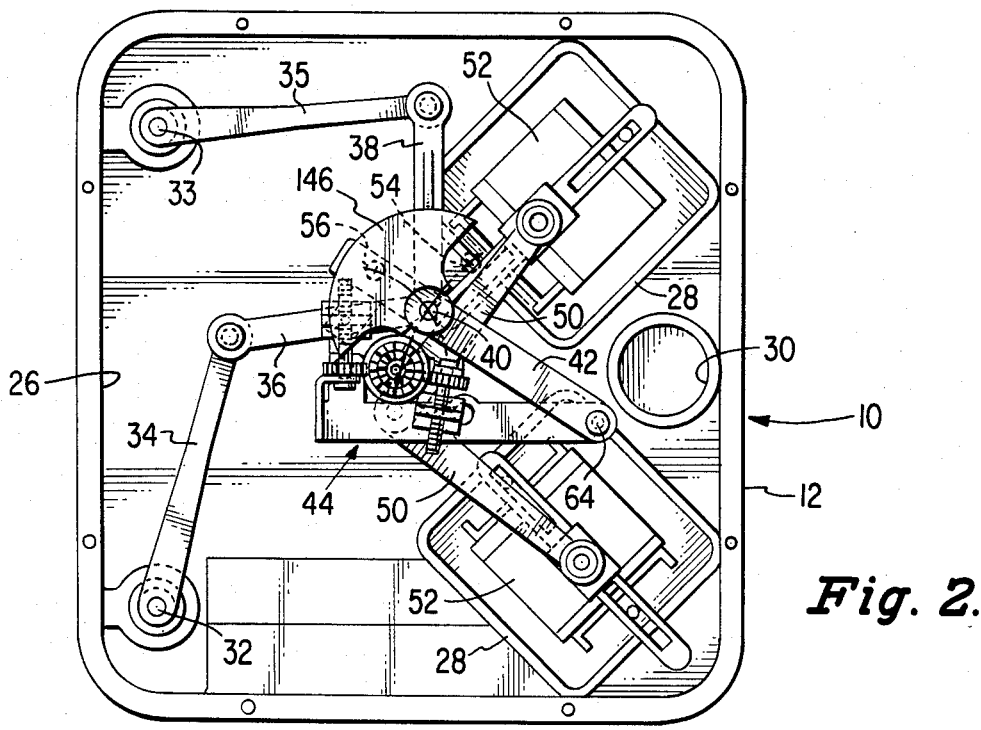
FIG. 2 is a top plan view, with the cover removed, of the meter shown in FIG. 1, showing a preferred embodiment of the inventive tangent assembly.

Referring now to FIG. 2, shown therein is the gas distributing chamber 26 of the meter 10. As is well known, gas enters the inlet connector 16 and passes into the gas distributing chamber 26 for delivery to the gas measuring chambers (not shown) through the valve seats 28 which control the flow of gas into and out of the gas measuring chambers for subsequent exiting from the meter at the outlet 30 through the outlet connector 18. Flag rods 32, 33, are connected to be actuated by the measuring chambers and are fixed to the long flag arms 34, 35, respectively, connected by the short flag arms 36 and 38 to the wrist pin or post 40 fixedly attached to the stroke plate 42 of the improved adjustable tangent assembly, designated generally by the reference numeral 44. As is shown more clearly in FIG. 3, the tangent assembly 44 has a lock plate 46 nonrotatably connected to a crank shaft 48 having the usual crank connected by arms 50 to slide valves 52 on the valve seats 28. The volume of gas measured by the meter 10 is controlled by the valves 52, which in turn are adjustable as to timing and controlled by the diaphragm stroke, which in turn is adjustable at the tangent assembly 44. As shown in FIG. 2, the adjustment of the tangent assembly 44 adjusts the position of the wrist pin 40 with respect to the axis of rotation of the crank shaft 48. Adjustment along the broken line 54 controls the stroke of the diaphragm flag arms 36 and 38 corresponding to the volume displacement thereof. Adjustment along the broken line 56 controls the timing of the valve operation, so as to change the time of opening and closing of the valves 52. The broken lines 54 and 56 are substantially perpendicular to each other. With the exception of the improved tangent assembly 44, the described components are or may be of conventional design.

Figures 3, 3A:
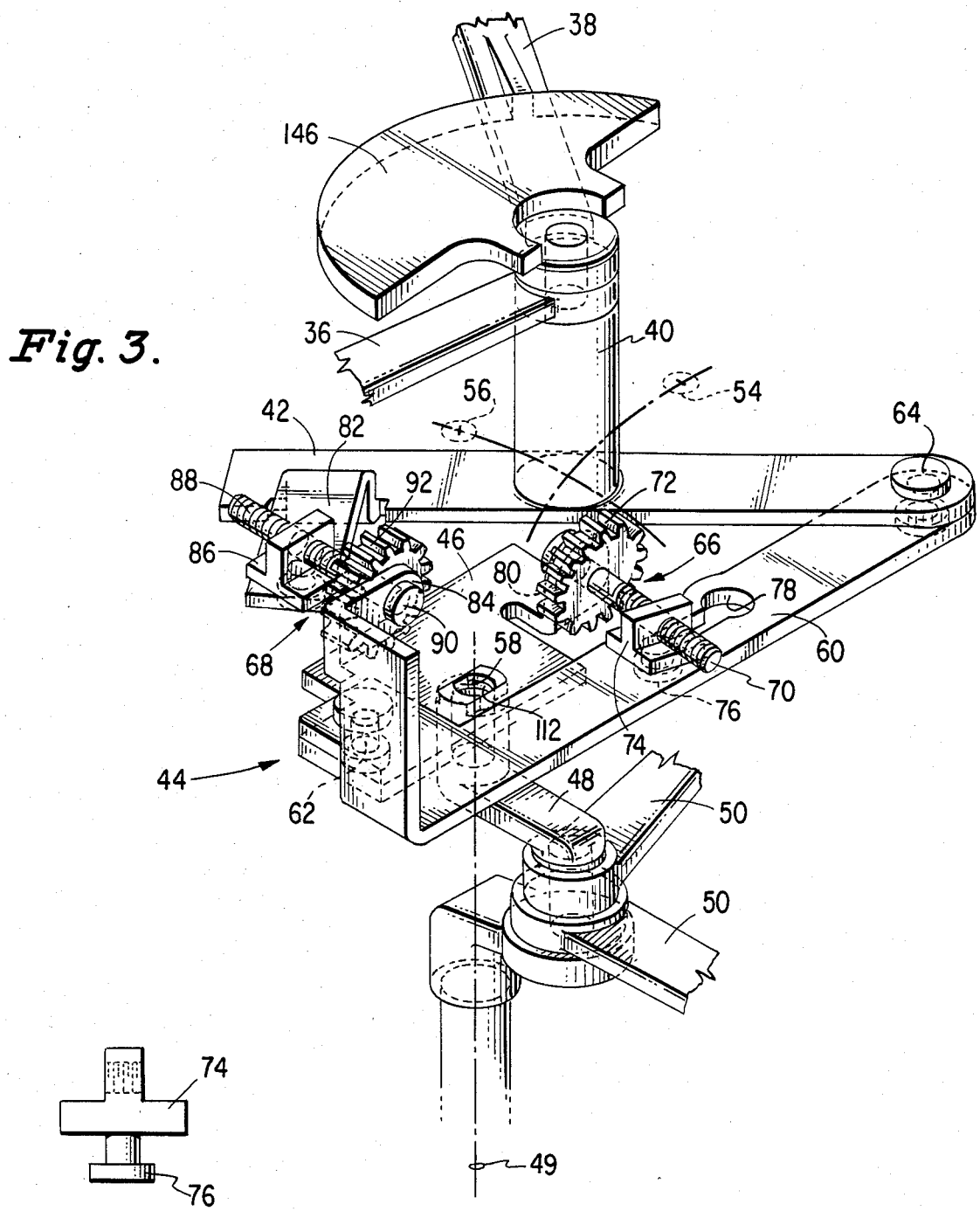
FIG. 3 is an enlarged perspective view of a tangent assembly constructed in accordance with the principles of this invention, with the adjustment mechanism removed for purposes of clarity.
FIG. 3A is an end view of an adjustment block used in the inventive tangent assembly.

Referring now to FIG. 3, shown therein is an enlarged perspective view of the tangent assembly 44 according to the present invention after the removal of the adjusting mechanism therefrom. The tangent assembly 44 includes a lock plate 46 nonrotatably connected to the crank shaft 48 along its axis of rotation 49. Illustratively, the lock plate 46 includes an aperture 58 shaped generally from a circle of the same diameter as the upper extremity of the crank shaft 48 but with straightened sides and the upper extremity of the crank shaft 48 is slabbed to be complementary to the aperture 58 so that when the upper extremity of the crank shaft 48 is inserted into the aperture 58, a nonrotatable connection is formed between the lock plate 46 and the crank shaft 48. (Other nonrotatable torque transmitting connections may be used, such as a square shaft and hole, tabs, etc.) The tangent assembly 44 further includes a timing plate 60 pivotally connected to the lock plate 46 by a pivot pin 62. At the other end of the timing plate 60, a second pivot pin 64 provides a pivotal connection between the timing plate 60 and the stroke plate 42. As was previously mentioned, the stroke plate 42 has fixedly connected thereto the wrist pin 40, to which are connected the flag arms 36 and 38.

To provide for a rigid, but adjustable, connection between the lock plate 46, the timing plate 60 and the stroke plate 62, there is provided a first connecting mechanism 66 and a second connecting mechanism 68. The first connecting mechanism 66 includes a threaded shaft 70 having a gear 72 affixed thereto. The shaft 70 is threaded into an adjusting block 74 mounted on, or part of, the timing plate 70, the adjusting block 74 having an internally threaded through bore for accommodating the threaded shaft 70. FIG. 3A illustrates an end view of a preferred adjusting block 74 which is seen to have a headed depending portion 76. To accommodate the adjustment block 74, the timing plate 60 is provided with a keyhole-shaped aperture 78 which allows the headed depending portion 76 to be inserted into the large round portion of the aperture 78 and then moved along the elongated portion thereof. Accordingly, the adjusting block 74 is free to slide longitudinally along the aperture 78. To secure the shaft 70 to the lock plate 46, the lock plate 46 is formed with an upstanding tab 80 having an opening therethrough through which the shaft 70 may extend and in which the shaft 70 may freely rotate. The shaft 70 is provided with a head or snap ring (not shown) larger than the opening in the tab 80 and is further provided with a knurled portion between the head and the threads onto which the gear 72 is force fit after the shaft 70 is inserted through the opening in the tab 80. Accordingly, when the gear 72 is rotated, the timing plate 60 is pivoted with respect to the lock plate 46 about the pin 62.

The second connecting mechanism 68 is similar to the first connecting mechanism 66 and provides a connection beween the timing plate 60 and the stroke plate 42. Accordingly, the stroke plate 42 is formed with an extension 82 and the timing plate 60 is formed with a tab 84. The extension 82 is formed with an open ended slot (not shown) holding the adjusting block 86, which may be identical in construction to the adjusting block 74. The second connecting mechanism 66 also includes a threaded shaft 88 having a head 90 at one end. The adjusting block 86 has an internally threaded opening into which the shaft 88 may be screwed. The tab 84 has an opening, smaller than the head 90, in which the shaft 88 may freely rotate. Press fit onto a knurled portion of the shaft 88 is a gear 92. Accordingly, by turning the gear 92, the distance between the tab 84 and the adjusting block 86 may be varied to cause the stroke plate 42 to pivot with respect to the timing plate 60 about the pivot pin 64.

Thus, by turning the gear 72, the wrist pin 40 is caused to move along the broken line 56, which is a segment of a circle having its center at the pivot pin 62. Similarly, by turning the gear 92, the wrist pin 40 is caused to move along the broken line 54, which is a segment of a circle having its center at the pivot pin 64.

Figure 4:
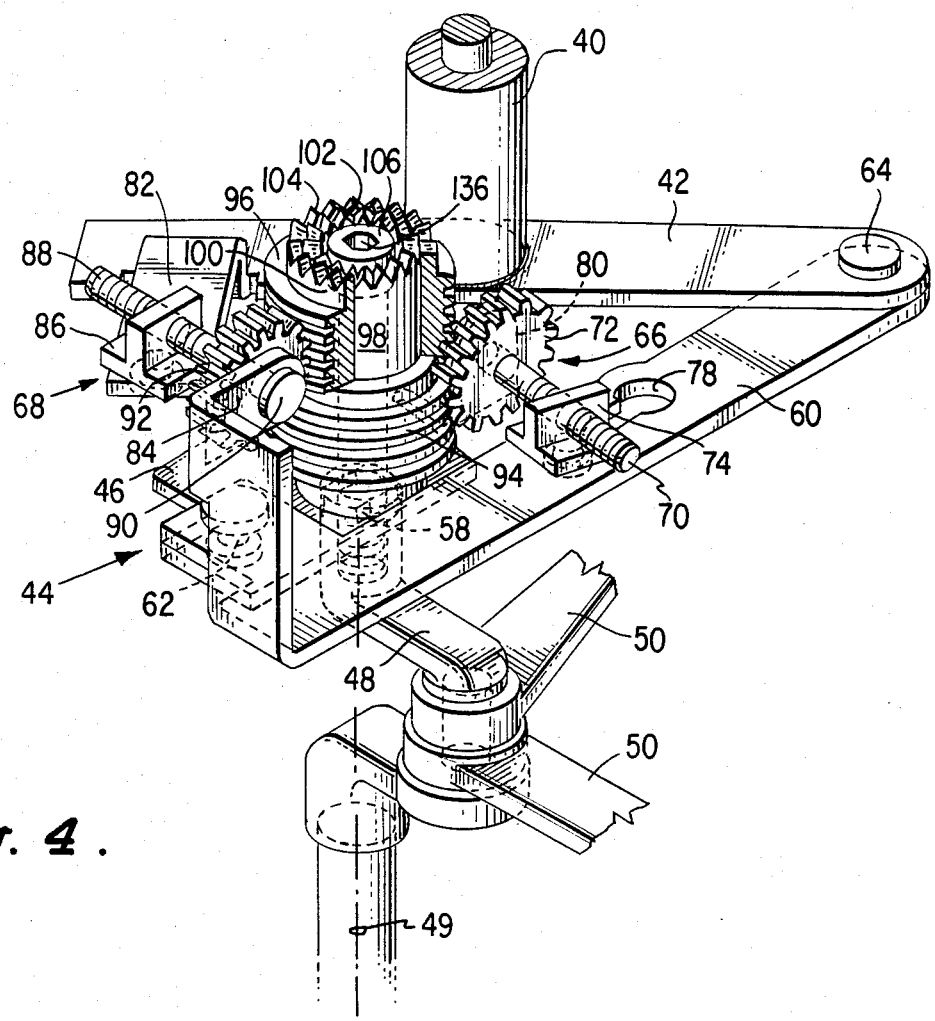
FIG. 4 is an enlarged perspective view similar to that of FIG. 3, showing the adjustment mechanism in place.

FIG. 4 illustrates the tangent assembly 44 including the adjusting mechanisms whereby the gears 72 and 92 may be turned to independently vary the stroke and timing. Accordingly, there is provided a first worm 94 engaged with the gear 72 and a second worm 96 engaged with the gear 92. The worms 94 and 96 are coaxial, with each having an integral extension 98 and 100, respectively, the ends of which are formed as a pair of concentric face gears 102 and 104, respectively. As may be seen more clearly from FIG. 6C, the worm 96 is longitudinally adjacent the worm 94 and external to the extension 98. The outside diameter of the extension 98 is slightly less than the inside diameter of the worm 96 so that the worms 94 and 96 are free to rotate with respect to each other. The worm 94 is formed with a central axial bore and the first and second adjusting mechanisms are held in place illustratively by a threaded locking screw 106. (Other attachments are of course possible). The locking screw 106 has a head 108 at the end opposite the threads and a smooth intermediate portion 110 between the head and the threads. The threaded end of the locking screw 106 is secured in an internally threaded bore 112 (FIG. 3) formed in the crank shaft 48 and coaxial with the axis of rotation 49 of the crank shaft 48. The outer diameter of the portion 110 of the screw 106 is slightly smaller than the inside diameter of the central axial bore of the worm 94 so that the worm 94 is free to rotate thereabout. The extension 98 of the worm 94 is inset inside the face gear 102 so that the upper surface 114 of the head 108 is substantially coplanar with the gears 102 and 104. It is noted that other arrangements for practicing this invention may not be coplanar. For example, the use of bevel gears in place of face gears may result in an arrangement which is not coplanar.

FIG. 5 illustrates a tool 24, partially in longitudinal section, which may be utilized for effecting adjustment of the tangent assembly 44. The tool 24 includes a first tube, or barrel, 116, and a second tube, or barrel, 118, concentric with each other. The first tube 116 has a face gear 120 at its free end and the second tube 118 has a face gear 122 at its free end, the face gears 120 and 122 being substantially coplanar. Again, other arrangements may not be coplanar. The face gear 120 is adapted to mesh with the face gear 102 of the adjusting mechanism and the face gear 122 is adapted to mesh with the face gear 104 of the adjusting mechanism. To turn the tubes 116 and 118, at the ends opposite the face gears 120 and 122, the tubes 116 and 118 are formed with respective bevel gears 124 and 126. The tool 24 is provided with a first adjusting knob 128 having a bevel gear 130 adapted to mesh with the bevel gear 124. The tool 24 is further provided with a second adjusting knob 132 having a bevel gear 134 adapted to mesh with the bevel gear 126. Thus, turning the adjusting knob 128 turns the tube 116 which is adapted to turn the worm 94 to turn the gear 72 to adjust the timing. Similarly, turning the adjusting knob 132 is adapted to adjust the stroke.

With the tangent assembly according to the present invention, it is imperative that when an adjustment is being made, the crank shaft 48 be prevented from rotating. Accordingly, the locking screw 106 is provided with a recessed socket 136, illustratively hexagonal in shape, in its head 108. The tool 24 is provided with a locking shaft 138 having a projection 140 shaped complemental to the recessed socket 136. At the end opposite the projection 140, the locking shaft 138 is threadedly or solidly secured to the handle 141 of the tool 24. The locking shaft 138 may further be provided with an extending tip 142 and the locking screw 106 may be provided with a further recess 144 which cooperates with the tip 142 for guiding purposes. Alternatively, the tool could have the recess and the head could have the complemental projection.

Figure 7A:
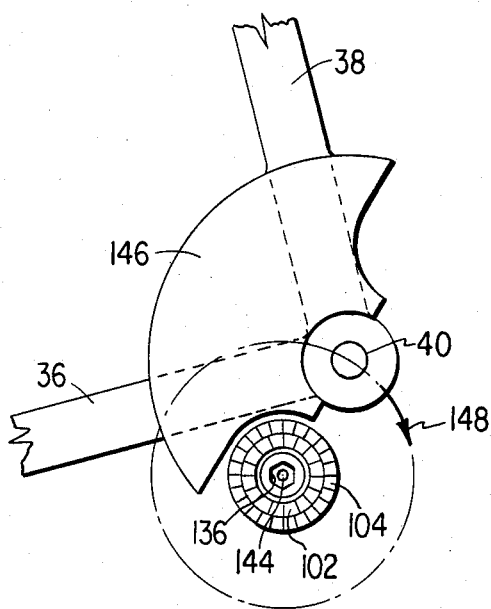
FIGS. 7A, 7B, 7C and 7D illustrate the angular relationships between the deflector shield and the adjusting mechanism.
Figure 7B:
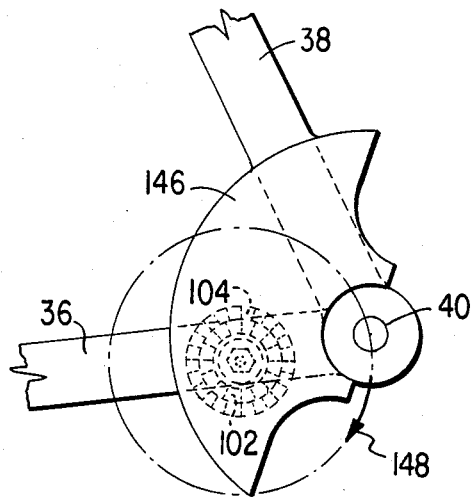
Figure 7D:
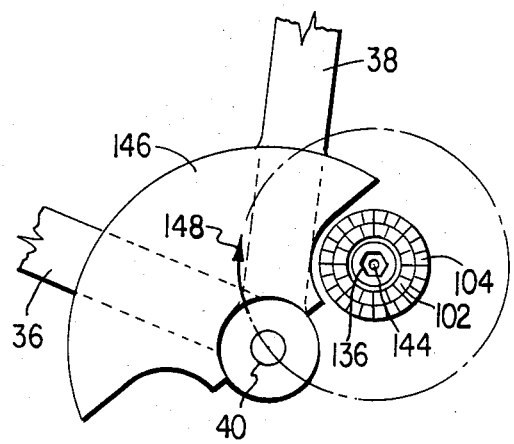
Figure 7C:
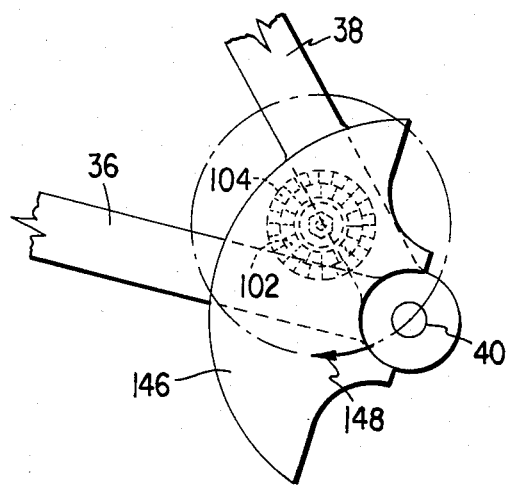

To prevent an adjustment to the tangent assembly 44 from being made except when the crank shaft 48 is in the proper angular position and the flag arms 36 and 38 are clear of the crank shaft axis of rotation, the gears 102 and 104 are shielded. This is accomplished by providing a deflector plate 146 fixedly mounted on the flag arm 38. FIGS. 7A, 7B, 7C and 7D show a sequence of positions of the deflector plate 146 as the wrist pin 40 travels around the axis of rotation of the crank shaft 48, as indicated by the arrow 148. FIGS. 7A and 7D illustrate the extremes of the range of positions where the gears 102 and 104 are accessible to the tool 24 for adjustment of the timing and stroke. FIGS. 7B and 7C illustrate positions where the deflector plate 146 prevents access to the gears 102 and 104.

FIGS. 6A, 6B and 6C illustrate the sequence involved in engaging the tool 24 with the adjusting gears 102 and 104. As shown in FIG. 6A, the tool 24 is inserted through the bore 20 in the cover 14 but is prevented from engaging the gears 102 and 104 because the deflector plate 146 is shielding the gears 102 and 104. FIG. 6B illustrates the condition where the deflector plate 146 has moved to a position where the gears 102 and 104 are exposed and the tool 24 is inserted sufficiently so that the tip 142 has entered the recessed socket 136 but the gears 120 and 122 are not yet meshed with the gears 102 and 104, respectively. FIG. 6C illustrates the condition where the tool 24 is fully inserted with the gears 120 and 122 being meshed and the gears 104 and 122 being meshed. Additionally, the projection 140 is inserted in the socket 136 so that crank shaft 48 cannot rotate if the tool 24 is held firmly. Adjustment of the timing and stroke may then be effected through rotation of the adjusting knobs 128 and 132, respectively.

The aforedescribed arrangement lends itself to both manual and automated adjustment. For manual adjustment, the plug 22 is removed from the cover 14 of the meter 10 and the tool 24 is inserted through the bore 20 into locking engagement with the adjusting mechanism. The technician can then adjust the meter accordingly. For automated adjusting, turning of the adjusting knobs 128 and 132 may be effected through small stepping motors. Very high resolution can be attained because a fixed angular turning of the adjustment knobs corresponds to fixed changes in the timing and stroke. The use of worms and worm gears also provides a self locking feature for the adjustment mechanism.

Accordingly, there has been disclosed an improved adjustable tangent assembly for a diaphragm gas meter and a tool for use therewith. It is understood that the abovedescribed arrangement is merely illustrative of the application of the principles of this invention. Numerous other arrangements may be devised by those skilled in the art without departing from the spirit and scope of this invention, as defined by the appended claims. Thus, for example, the stroke plate may be pivotally connected to the lock plate. Also, other coaxial gearing arrangements could be utilized in place of face gears. Further, although the use of worms is preferred due to their self locking characteristic, the use of other types of gearing is possible.

We claim:
1. A tangent assembly for a positive displacement diaphragm gas meter to drivingly couple a flag assembly to a crank shaft, comprising:
   a lock plate non-rotatably connected to said crank shaft along the axis of rotation thereof;
   a timing plate;
   a stroke plate pivotally connected to said timing plate;
   means for pivotally connecting one of said timing and stroke plates to said lock plate;
   a first connecting mechanism connected between said lock plate and said one of said timing and stroke plates, said first connecting mechanism being adjustable and adapted to vary the distance between its connection point on said lock plate and said one of said timing and stroke plates so as to pivot said one of said timing and stroke plates with respect to said lock plate;

a second connecting mechanism connected between said stroke plate and said timing plate, said second connecting mechanism being adjustable and adapted to vary the distance between its connection points on said stroke plate and said timing plate so as to pivot said stroke plate with respect to said timing plate;

first adjusting means mounted on said lock plate and coupled to said first connecting mechanism for effecting adjustments to said first connecting mechanism;

second adjusting means mounted on said lock plate and coupled to said second connecting mechanism for effecting adjustments to said second connecting mechanism;

a wrist pin connected to said stroke plate and extending outwardly therefrom parallel to said crank shaft axis of rotation; and means for connecting said flag assembly to said wrist pin.

2. The assembly according to claim 1 further including means for preventing rotation of said crank shaft during adjustment of said first and second connecting mechanisms.

3. The assembly according to claim 1 further comprising shielding means mounted on said flag assembly for defining a first range of relative positions of said flag assembly with respect to said crank shaft during which said first and second adjusting means are accessible and a second range of relative positions during which said first and second adjusting means are inaccessible.

4. The assembly according to claim 3 wherein said shielding means includes a deflector plate member fixedly mounted on one of the flag arms of said flag assembly at the end connected to said wrist pin.

5. The assembly according to claim 1 wherein said first and second adjusting means are both coaxial with the axis of rotation of said crank shaft.

6. The assembly of claim 5 and a housing therefor comprising:

a body portion having an open end exposing said tangent assembly; and a cover portion, said cover portion being adapted to be secured to said body portion to close said open end, said cover portion being formed with a threaded bore therethrough coaxial with said crank shaft axis of rotation when said cover portion is secured to said body portion and said cover portion further including an externally threaded plug adapted to be threadedly secured in said bore.

7. The assembly according to claim 5 wherein each of said first and second adjusting means includes a worm coaxial with the axis of rotation of said crank shaft and each of said first and second connecting mechanisms includes a worm gear meshed with its respective worm and fixedly mounted on a threaded shaft, said threaded shaft for said first connecting mechanism extending between said lock plate and said one of said timing and stroke plates and being threadedly secured to one of said lock plate and said one of said timing and stroke plates and freely rotative but longitudinally secured with respect to the other, said threaded shaft for said second connecting mechanism extending between said stroke plate and said timing plate and being threadedly secured to one of said stroke plate and said timing plate and freely rotative but longitudinally secured with respect to the other.

8. The assembly according to claim 7 wherein each of said worms has a face gear fixedly secured thereto, said face gears for said first and second adjusting means worms being concentric.

9. The assembly according to claim 8 further including means for preventing rotation of said crank shaft during adjustment of said first and second connecting mechanisms.

10. The assembly according to claim 9 wherein each of said worms is formed with an axial bore, said lock plate is formed with an aperture exposing at least a portion of said crank shaft, said crank shaft is formed with an internally threaded bore concentric with its axis of rotation, and further including an elongated member externally threaded at one end and extending through the axial bores of said worms and the aperture of said lock plate and threadedly secured in the bore of said crank shaft, said elongated member having a head at the end opposite the external threads, said head being larger than the bores of said worms which in turn are larger than the remainder of said member to allow said worms to freely rotate thereabout, said crank shaft rotation preventing means including engagable means formed on said head for providing a holding surface.

11. The assembly of claim 10 and a tool for use therewith comprising:

a first tube having a face gear at one end thereof adapted to engage the face gear associated with the first adjusting means;

a second tube concentric with said first tube and having a face gear at its end close to said one end of said first tube and adapted to engage the face gear associated with the second adjusting means;

means for rotating said first tube independently of said second tube; and means for rotating said second tube independently of said first tube.

12. The tool according to claim 11 further including means for engaging said engageable means to prevent rotation of said crank shaft.

13. The tool according to claim 12 where said engageable means and said engaging means of said tool comprise a combination of complementally shaped recess and projection.

* * * * *